Nov. 11, 1947. J. W. VAN DENBURG 2,430,749
SEWAGE DISPOSAL EQUIPMENT
Filed July 19, 1945 2 Sheets-Sheet 1

INVENTOR
John W. Van Denburg
BY
Pennie Davis Marvin Edmonds
ATTORNEYS

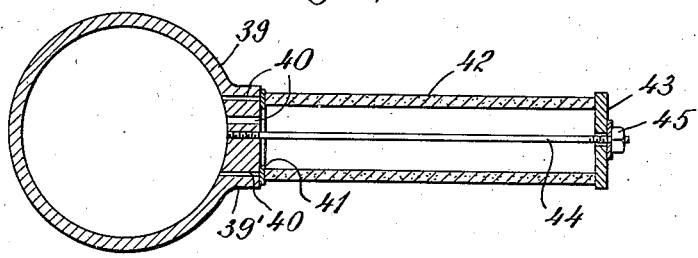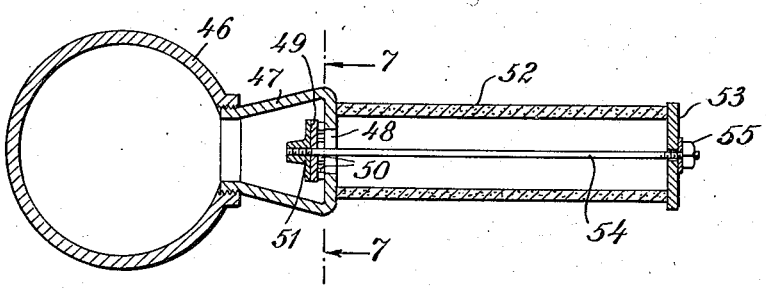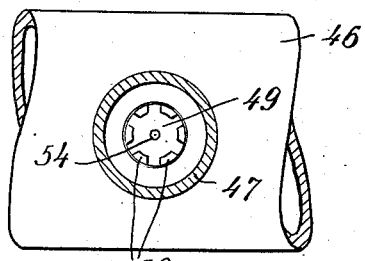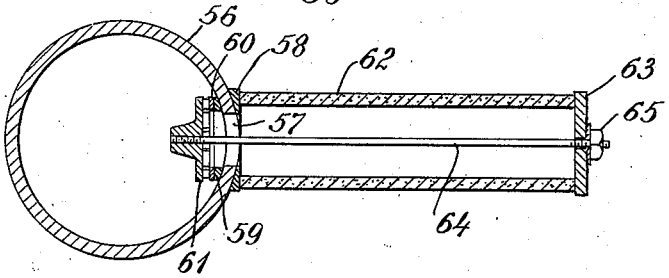

Patented Nov. 11, 1947

2,430,749

UNITED STATES PATENT OFFICE 2,430,749

SEWAGE DISPOSAL EQUIPMENT

John W. Van Denburg, New York, N. Y.

Application July 19, 1945, Serial No. 605,916

7 Claims. (Cl. 261—122)

This invention relates to air diffusing means, including porous diffusing tubes supplied with air under pressure, such as are employed in aerating tanks in installations for the treatment of sewage. More particularly, the invention is concerned with a novel air diffusing means which insures even distribution of the air through the tank in which it is installed, so long as the diffusing tubes are uninjured, but, upon breaking of a tube, releases additional air so as to give prompt warning to the attendant of the damage.

It has been the common practice heretofore to provide aerating tanks for sewage treatment with air diffusing means including one or more headers mounted in the bottom of each tank and usually near a wall. Each header is provided with a plurality of outlets along its length and carries a diffuser tube extending outwardly at each outlet. The diffuser tubes are porous and made of materials, such as carbon, so that they are somewhat delicate and are subject to being broken. Each header is supplied with air under pressure and the tubes are closed at their outer ends so that the air entering the tubes can escape only through the porous walls.

As such tanks are ordinarily relatively long and it is important that the air distribution throughout the tanks be uniform, it has been proposed to mount each tube on an adapter threaded into an opening in the header wall, the adapter having a restricted air passage through it. If a tube breaks, the adapter remains in position and continues its throttling action, so that there is comparatively little increased escape of air because of the broken tube. This arrangement is subject to the objection, however, that the air escaping from the adapter of a broken tube is not properly diffused through the contents of the tank but the continued throttling of the air may prevent the operator of the plant from detecting the damage. The equipment may, accordingly, be operated for some time with one or more tubes broken and such operation is, of course, inefficient.

The present invention is directed to the provision of air diffusing means including porous diffuser tubes, which is provided with means for insuring uniform distribution of air, while the tubes are intact and uninjured. In addition, the new diffusing means is so constructed that, in the event of breakage of a tube, the air control means for that tube becomes ineffective, and, as a result, increased air flow occurs at the broken tube and gives a warning to the attendant that cannot go unobserved.

For a better understanding of the invention, reference may be had to the accompanying drawings, in which Fig. 1 is a transverse cross-sectional view showing the air diffusing means of the invention installed in aerating tanks;

Figs. 4, 5 and 6 are views similar to Fig. 2 showing modified forms of the device;

Fig. 7 is a sectional view on line 7—7 of Fig. 6; and

Fig. 8 is a view similar to Fig. 2 showing another modification.

Figure 1:
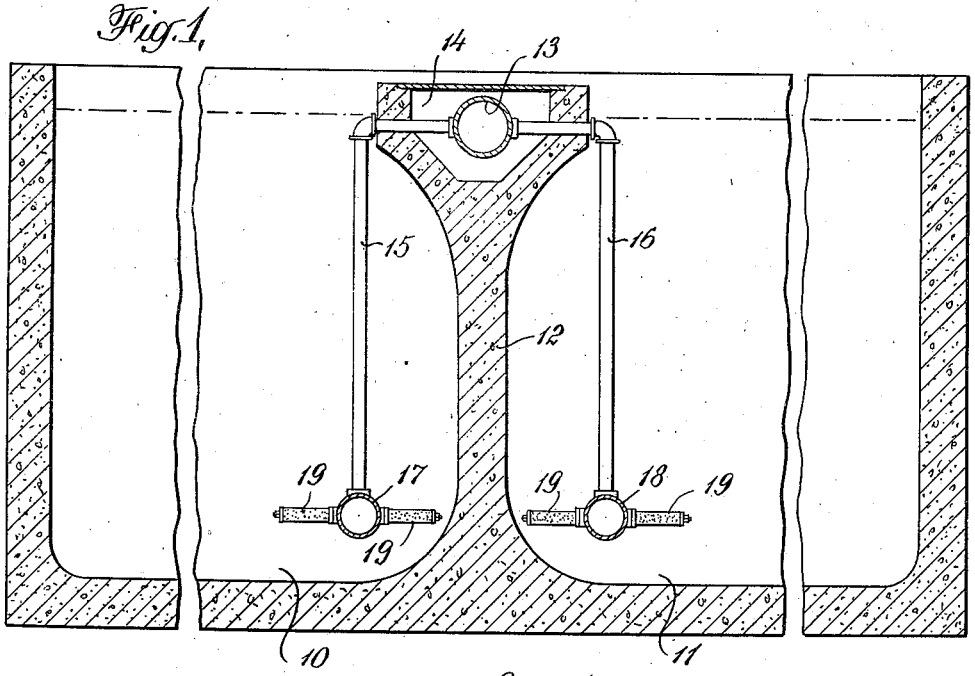

The air diffusing means of the invention are shown in Fig. 1 installed in a pair of aerating tanks 10, 11, which have a common central wall 12. A main air supply line 13 is mounted in a channel 14 at the top of wall 12, and branch pipes 15, 16 lead downwardly from the line 13 through the tanks to headers 17, 18, respectively, near the bottoms of the tanks. Headers 17, 18 are provided with lateral discharge openings at intervals along their length, and porous diffusing tubes 19 are mounted on the headers 17, 18 to receive air through the outlets from the headers. The porous tubes are closed at their outer ends, and the air supplied under pressure to headers 17, 18 escapes through the porous walls of the tubes and flows upward through the contents of the tanks.

Figure 2:
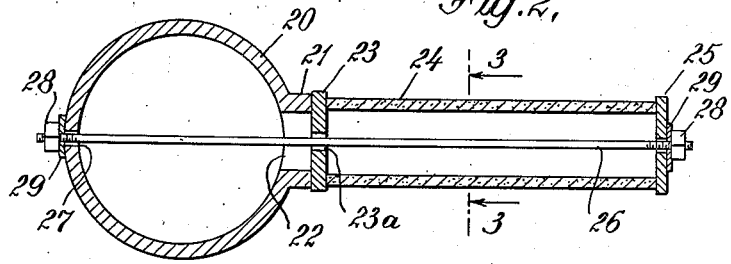
Fig. 2 is a view partly in transverse and partly in longitudinal cross-section through one form of the device of the invention.
Figure 3:
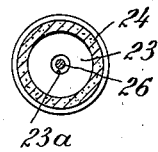
Fig. 3 is a sectional view on the line 3—3 of Fig. 2.

The air diffusing means of the invention may take various specific forms, and in the construction shown in Fig. 2, the header 20, which corresponds to either header 17, 18, is formed with a flange 21 around each outlet opening 22. A throttling disc 23 is seated on the end of the flange, and the porous diffusing tube 24 bears against the outer face of the disc. The outer end of the tube 24 is closed by a disc 25, and a rod 26 extends through disc 25, tube 24, the restricted opening 23a of the throttling disc 23, and through the header 20 and out through an opening 27, aligned with the outlet opening 22. Rod 26 is threaded at both ends, and nuts 28 screwed on the rod serve to clamp the parts of the assembly together. Gaskets 29 beneath the nuts 28 prevent the escape of air around the rod.

With the construction described in Fig. 2, air supplied under pressure to header 20 flows outwardly through the restricted opening 23a in the throttling disc into the interior of tube 24, and then escapes through the porous wall of the tube. So long as the tube remains intact, the throttling disc is held in position by being clamped between the end of tube 24 and the end of flange 21. If the tube becomes broken, the clamping rod can no longer perform its function, and disc 23 falls out of place. A flow of air in a greater amount than that permitted by the disc, when it is in operative position, then takes place, and the excessive flow of air causes such bubbling as will be readily noted by the attendant. The damaged tube may then be removed in the usual way, and the assembly restored to its original condition.

Figure 4:
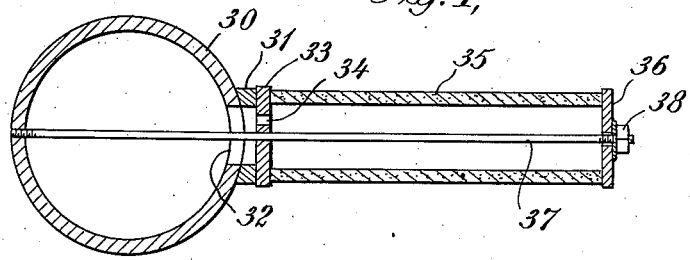

The construction shown in Fig. 4 is similar to that shown in Fig. 2, except that the header 30 is not provided with an integral flange, but instead, a short length of tubing 31 is seated against the outside of the header around the discharge opening 32. A throttling disc 33, having a restricted passage 34 therethrough, is seated on the outer end of tubing 31 and held in place by the porous tube 35. The porous tube is closed at its outer end by a disc 36, and a rod 37, which is threaded into the wall of the header opposite the discharge opening 32, extends through aligned openings in discs 33 and 36. A nut 38 threaded on the rod bears against disc 36 and clamps the several parts in place. As in the Fig. 2 construction, the braking of the tube 35 releases disc 33, and the disc is unseated, either by the action of gravity or by the air under pressure behind it. With the unseating of disc 33, an increased flow of air occurs to warn the attendant.

In the construction shown in Fig. 5, the header 39 is formed with bosses 39' each having a plurality of air passages 40 therethrough. A throttling disc 41 seated on the outer end of each boss closes certain of the air passages, while leaving at least one open. Disc 41 is held in place by a porous tube 42, the outer end of which is closed by a disc 43. A rod 44 passes through discs 41 and 43 and is threaded into boss 39. A nut 45 on the end of the rod bears against disc 43 and serves to clamp the assembled parts in operative relation. Upon breaking of tube 42, disc 41 drops down to open all of the passages through boss 39, thus producing the increased flow of air desirable for warning purposes.

In the construction shown in Fig. 6, the header 46 has a plurality of internally threaded outlets into each of which is screwed a hollow fitting 47. Each such fitting has an opening 48 in its outer end, and it is formed with internal and external seats around the opening. A disc 49 having a plurality of spaced projections 50 on one face is seated on the internal seat within the fitting, and the disc is held in place by a block 51 lying within the fitting. A porous tube 52 bears against the external seat on the outer face of the fitting and has its outer end closed by disc 53. A rod 54 extends through disc 53 and is threaded into the block 51, and a nut 55 threaded on the outer end of the rod bears against disc 53. When the parts are in assembled relation, as shown in Fig. 6, air may flow in a limited amount through the spaces between projections 50 on plate 49 and thence through the opening 48 in the end fitting 47 into the interior of tube 52. If tube 52 becomes broken, rod 54 drops and disc 49 is unseated, so that an increased amount of air may flow from the header through the fitting.

In the construction shown in Fig. 8, the header 56 is formed with a plurality of outlet openings 57, and a washer 58 is seated on the outside of the header around each opening. Another washer 59 is seated against the inner wall of the header around the opening 57, and a plate 60, which is generally similar to plate 49, is held against the inner face of washer 59 by a block 61. A porous tube 62 bears against the outer end of washer 58, and the tube is closed at its outer end by a disc 63. A rod 64 threaded into block 61 extends through tube 62 and disc 63, and is provided at its exposed end with a nut 65 which bears against disc 63 and serves to keep the parts in proper assembled relation. If tube 62 becomes injured, rod 64 drops and this permits disc 60 to be unseated. When disc 60 is off its seat, it can no longer limit the amount of air escaping through outlet 57, and the increased air flow acts as a warning signal.

In all forms of the new air diffusing means described, the flow of air from the header into each diffusing tube is normally throttled, so that it is possible to obtain a uniform air discharge through the tubes from one end of the header to the other or for adjacent groups of headers. The throttling action at each tube continues only so long as that tube is intact, and, whenever any tube becomes damaged and the throttling device becomes inoperative, an increased air flow immediately takes place from the outlet, by which the tube was supplied with air, and this flow is in such volume as to give immediate warning to the operator of the equipment. There is, therefore, little likelihood of the installation operating for any considerable amount of time without the operator being aware that one or more diffusing tubes have become broken.

What is claimed is:

1. Air diffusing means which comprises a header supplied with air under pressure and having outlet means, a member operable when held in one position to limit the escape of air through the outlet means, a porous diffuser tube closed at one end and receiving air at its other end from the outlet means, and means for holding the member in operative position and maintaining the tube in place to receive air, the holding means becoming ineffective upon breaking of the tube, whereby the member moves from operative position.

2. Air diffusing means which comprises a header supplied with air under pressure and having outlet means, a member operable when held in one position to limit the escape of air through the outlet means, a porous diffuser tube closed at one end and receiving air at the other end from the outlet means, and means including a rod extending through the tube and connected to the closed end thereof for holding the tube in place and the member in operative position, the holding means becoming ineffective upon breaking of the tube, whereby the member moves from operative position.

3. Air diffusing means which comprises a header supplied with air under pressure and having outlet means, a porous diffuser tube closed at one end and receiving air at its other end from the outlet means, a member held between the tube and the outlet means and effective in such position to limit the escape of air from the outlet means into the tube, and means for supporting the tube in place and thereby holding the member in operative position, the breaking of the tube rendering the supporting and holding means ineffective, whereby the member moves from operative position and ceases to limit the flow of air through the outlet means.

4. Air diffusing means which comprises a header supplied with air under pressure and having outlet means, a seat adjacent the outlet means, a member effective when held on the seat to limit the flow of air through the outlet means, a porous diffuser tube closed at one end and receiving air from the outlet means at the other, and means engaging the tube at a point remote from its open end for holding the tube in place and the member on the seat, the breaking of the tube rendering the holding means ineffective, whereby the member falls from the seat to inoperative position.

5. Air diffusing means which comprises a header supplied with air under pressure and having outlet means, a seat adjacent the outlet means, a plate operable when held on the seat to limit the flow of air through the outlet means, a porous air diffuser tube having an outer closed end and mounted with its inner open end against the plate to receive air therethrough, and means for holding the tube to clamp the plate in position, the breaking of the tube rendering the holding means inoperative, whereby the plate falls from operative position.

6. Air diffusing means which comprises a header supplied with air under pressure and having outlet means, a seat adjacent the outlet means, a plate operable when held on the seat to limit the flow of air through the outlet means, a porous air diffuser tube having an outer closed end and mounted with its inner open end against the plate to receive air therethrough, and a rod secured at one end to the header and at the other end to a part of the tube remote from its open end, the rod extending through the plate and tube and holding the tube to clamp the plate in operative position on the seat, the breaking of the tube rendering the rod ineffective, whereby the plate falls from operative position.

7. Air diffusing means which comprises a header supplied with air under pressure and having outlet means, a seat adjacent the outlet means and facing the header, a second seat adjacent the outlet means facing away from the header, a plate effective when held on the first seat for limiting the flow of air through the outlet means, a porous diffuser tube having a closed outer end and mounted with its open inner end against the second seat to receive air from the outlet means, and means for holding the plate and the tube on their respective seats, the breaking of the tube rendering the holding means ineffective, whereby the plate falls to inoperative position.

JOHN W. VAN DENBURG.

REFERENCES CITED

The following references are of record in the file of this patent:

UNITED STATES PATENTS

| Number | Name | Date |
|---|---|---|
| 2,221,346 | Durdin, Jr. | Nov. 12, 1940 |
| 2,212,841 | Maxwell | Aug. 27, 1940 |